United States Patent [19]

Bartusel et al.

[11] Patent Number: 4,720,296
[45] Date of Patent: Jan. 19, 1988

[54] METHOD AND APPARATUS FOR BENDING A GLASS PANE

[75] Inventors: Karl-Rudolf Bartusel; Alf Kriesenger, both of Stolberg; Werner Gatzweiler, Heinsberg, all of Fed. Rep. of Germany

[73] Assignee: Saint-Gobain Vitrage, Courbevoie, France

[21] Appl. No.: 894,626

[22] Filed: Aug. 1, 1986

[30] Foreign Application Priority Data

Aug. 1, 1985 [DE] Fed. Rep. of Germany ....... 3527558

[51] Int. Cl.$^4$ ............................................. C03B 23/023
[52] U.S. Cl. ....................................... 65/290; 65/106; 65/273; 65/291
[58] Field of Search ................. 65/103, 106, 107, 273, 65/286, 287, 289, 290, 291

[56] References Cited

U.S. PATENT DOCUMENTS

| | | | |
|---|---|---|---|
| 2,663,974 | 12/1953 | Thomson | 65/289 |
| 3,009,201 | 11/1961 | Hansen | 65/287 X |
| 3,251,672 | 5/1966 | Touvay et al. | 65/291 |
| 4,312,661 | 1/1982 | Hagedorn et al. | 65/290 |
| 4,470,835 | 9/1984 | Fecik et al. | 65/106 |
| 4,511,386 | 4/1985 | Kellar et al. | 65/287 X |
| 4,619,683 | 10/1986 | Halberschmidt et al. | 65/351 |

FOREIGN PATENT DOCUMENTS 801532  9/1958  United Kingdom .

*Primary Examiner*—Arthur Kellogg
*Attorney, Agent, or Firm*—Oblon, Fisher, Spivak, McClelland, & Maier

[57] ABSTRACT

Method and apparatus for bending a glass pane in which undesirable elongations, localized deformations and residual stresses are eliminated by the advantageous use of such practices as preventing relative sliding movement between the glass pane and the bending apparatus and controlling the path followed by movable elements of the bending apparatus that accomplish the bending. The movable elements are mounted for motion about articulated axes, and the articulated axes themselves undergo constant dislocation during the bending.

5 Claims, 8 Drawing Figures

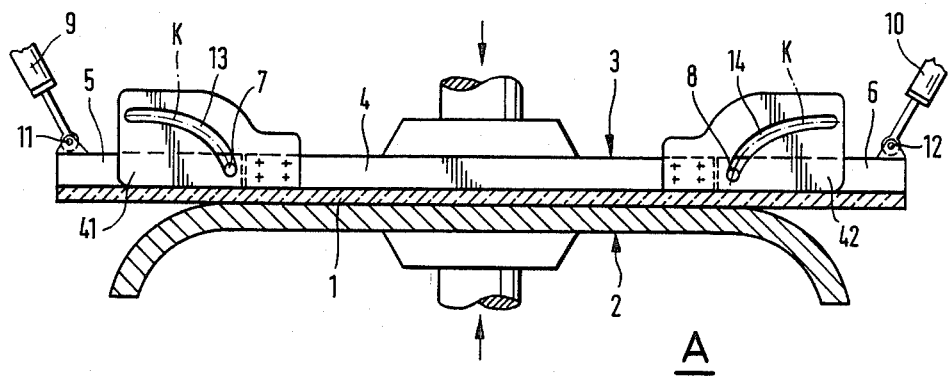
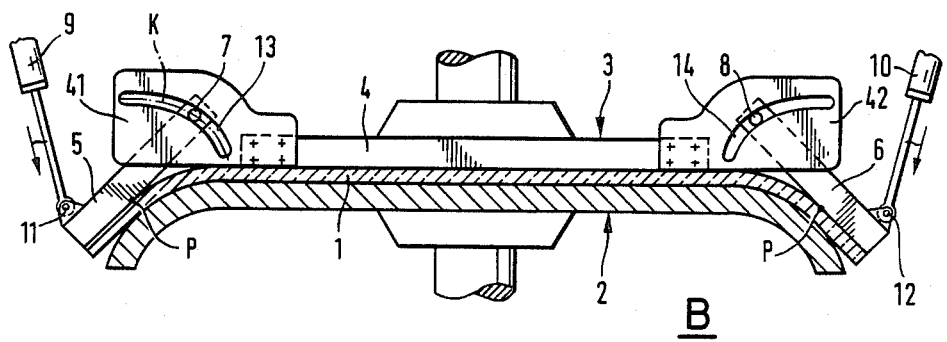
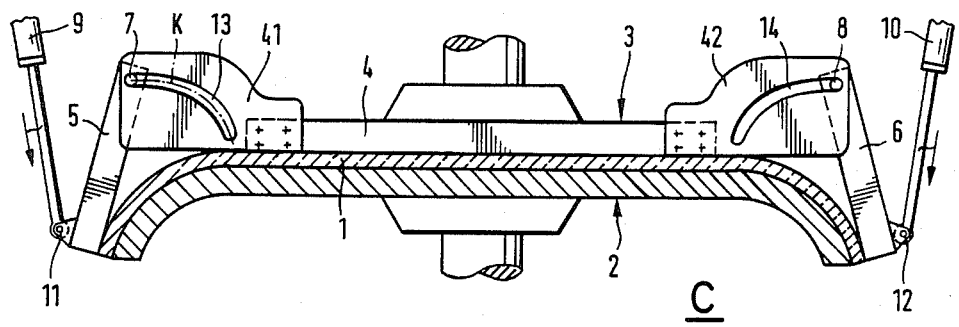
Fig. 1

METHOD AND APPARATUS FOR BENDING A GLASS PANE

BACKGROUND OF THE INVENTION

1. Field of the Invention

The invention concerns a procedure and apparatus for bending of a glass pane, for example an automobile glass pane, with the assistance of a multipart bending form whose form parts are connected to one another, whereby a glass pane, heated to the bending temperature, is grasped by the bending form and, through horizontal sweeping at least of one form part around an articulated axis, the pane is bent into the desired form.

2. Discussion of the Background

A customary procedure for bending of glass panes involves shaping the glass panes, heated to bending temperature in vertical position, with the assistance of a bending press comprising two bending tools. A male mold-shaped bending tool is typically constructed as a rigid all-over bending form, and a female mold-shaped bending tool as a multipart frame bending form whose individual form sections are connected through joints with one another. For bending of the glass pane, horizontally-sweepable lateral form sections of the female mold, having shapes corresponding to the desired form of the glass pane, are moved into an open position, the glass pane is grasped with the middle form section and pressed against the male mold-type bending form, and subsequently the lateral form sections are moved into a closed position, whereby the lateral sections of the glass pane are pressed against the male mold-shaped bending form. At the closing of the "folding corners", the glass pane is pulled in with increasing shaping by the bent folding corners, whereby significant relative movement occurs between the glass pane and the form surface of the bending form. Such multipart bending forms in particular find application in bending of glass panes with severely bent or respectively angled side parts. For example, they find application as windshield panes or rear panes in motor vehicles.

There are also known and customary bending procedures in which the glass pane to be bent is bent while in horizontal position, both with the assistance of pressing tools and according to the so-called "skeleton bending procedure" due to flection of the heated glass pane under the effect of its own weight on a frame bending form. The applied frame bending forms, in the case of severe curvatures, comprise several form sections which are hingedly connected with one another, and which more during the bending process through horizontal sweeping around their articulated axes from the closed position into the open one.

Furthermore, there are known procedures for bending of glass panes in the horizontal position in which the glass pane is grasped by one of several suction plates lowerable onto the heated glass pane, the plates being collectively flexible, and which, after the grasping of the glass pane, are bent together with the pane into the desired form. Procedures of this type are described for example in DE-OS No. 31 09 149 and in FR-OS Nos. 25 46 505, 25 46 506 and 25 46 507.

In the case of all of these known bending procedures, there cannot be helped a more or less severe sliding relative movement between the surface of the glass and the form surface of the sweepable form sections in contact with the glass surface. This relative movement between the form surface and the glass pane leads, as a rule, to an impairment of the glass surface which can manifest itself in minor deviations from the desired contour of the glass pane at the edge region, in undesired elongations or upsetting deformations of the glass pane in regions with severe curvature, and/or in surface damage to the glass pane.

SUMMARY OF THE INVENTION

An object of the invention lies in providing procedure and apparatus for bending of glass panes of the type named at the outset, that are free from the named disadvantages, and that successfully avoid every rubbing or sliding relative movement between the form surfaces of the sweepable form sections and the glass surface.

According to the invention, this object may be achieved by providing that the sweepable form part experiences constant dislocation of its articulated axis, which moves along a curved path whose shape is based upon the desired form of the glass pane, advancing on the glass pane in such a way that the glass pane is pressed agast the form surface of the bending form without relative sliding movement with respect to the bending form parts.

A first aspect of the current invention finds application in the case of a press-bending procedure, in which the glass pane is passed in vertical position between a one-part male mold and a multipart female mold of a bending press displaying form parts hingedly connected with one another. The glass pane is thereby pressed in sequential fashion against the male mold by the sweepable form parts rolling on the glass pane.

In this case, three-part bending forms as a rule come into application as female mold-type bending forms, which comprise one middle form piece with a relatively weak curvature and two sweepable form parts hinged on the middle one for bending of the severely curved side regions of the glass pane. According to one aspect of the current invention, the shape of such sweepable form parts does not correspond to the desired form of the glass pane, as is the case in the known procedures, but displays a lesser curvature, so that a rolling off or respectively an unwinding of this form part is possible, in which during the bending process, there always occurs only a line contact with the glass pane. For manufacturing of cylindrically curved bent pane regions, the sweepable form parts may have, for example, a flat form surface or even a form surface with curvature opposite to the desired form of the glass pane.

A second aspect of the current invention finds application in the case of bending of glass panes with the assistance of a plate-shaped suction form, in which case a glass pane is grasped by the suction form and bent through bending back of the lateral suction form parts. In this case, the procedure is so conducted that the glass pane, preferably in the horizontal position, is grasped by a suction form plate disposed above the glass pane, comprising several respectively rigid suction form plates hingedly connected with one another. The glass pane is bent under retention of the large-surface suction contact through sweeping back of the sweepable suction form parts under constant dislocation of their articulated axes.

The constant dislocation of the articulated axes along a predetermined curved path according to the current invention may be realized in various ways. For example, it is possible to locate the articulated axes of the sweepable form sections using guiding-link plates with incorporate guide grooves having the shape of the curved paths. Preferably, the connecting-link plates are mounted on the stationary part of the bending form. In lieu of such a guiding-link plate, the invention can nevertheless also be realized with the assistance of a multi-section crank apparatus. Such a crank apparatus has stationary or restricted guidance pivot points, which can be more advantageous than a guiding-link plate, under certain conditions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1A-1C illustrate a first embodiment according to the current invention at successive stages of bending of a glass pane over a rigid convex male mold;

DESCRIPTION OF THE PREFERRED EMBODIMENTS

Figure 2:
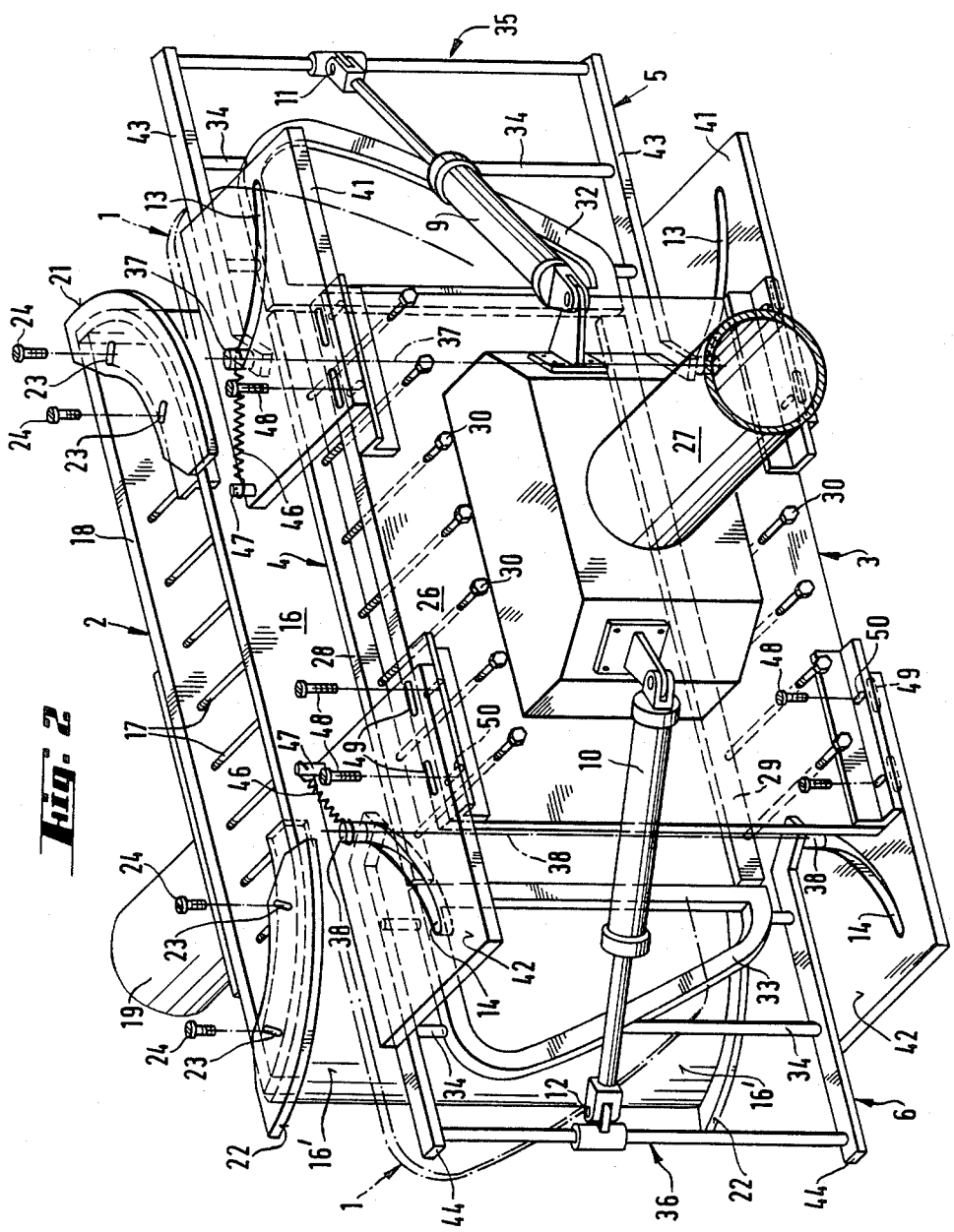
FIG. 2 is a rear perspective of a second embodiment according to the current invention in which glass panes are bent while in a vertical position.

Referring now to the drawings, wherein like reference numerals designate identical or corresponding parts throughout the several views, and more particularly to FIG. 1 thereof, there is shown a male mold 2, whose bending surface consists of one piece, and a multipart female mold 3. The female mold 3 is designed as a frame bending form, so that the glass pane 1 is touched by the female mold only along the edge of the pane. The female mold 3 comprises a rigid middle form part 4 and two lateral form parts 5 and 6, which are mounted for swiveling on the middle form part 4 by guiding-link plates. For bending of the glass pane 1, the lateral form parts 5, 6 first are moved into their rear, i.e. open, positions, then both the bending forms 2, 3 are pressed against the glass pane 1, whereby the middle form part 4 presses the middle part of the glass pane 1 against the middle part of the bending form 2, and subsequently both the lateral form parts 5, 6 swing around their swivelling articulated axes.

In the embodiment of FIGS. 1A-1C, the lateral form parts 5, 6 have flat form surfaces, and the glass pane 1 is given cylindrical curvatures in its lateral end regions. When the female mold 3 comes into contact with the flat glass pane 1 before the actual bending process, the lateral form parts 5,6 also have their entire contact surfaces lying adjacent to glass pane 1. This state is represented in FIG. 1A. For bending of the lateral end regions of the glass pane 1, the form parts 5, 6 are swung around the articulated axes 7, 8 with the assistance of pressure cylinders 9, 10, whose piston rods engage at the bearings 11, 12 disposed at the outer ends of the form parts 5, 6. During this swinging process, the articulated axes 7 and 8 move along the curves K.

The shape of the curves K is based on the desired curvature of the glass pane 1, and they affect the motions of the bending surfaces of the lateral form parts 5, 6. The curves K can be easily calculated on the basis of the given geometric conditions. The movement of the articulated axes 7 and 8 along the curves K guarantees that, during the bending process, no sliding relative movement between the form surfaces of the lateral form parts and glass upper surface occurs. In order to guarantee the guidance of the articulated axes 7, 8 along the desired curved paths K, the articulate axes 7, 8 are guided respectively in grooves 13, 14 corresponding to the curved paths K and formed in guiding-link plates.

As is particularly shown in FIGS. 1B and 1C which represent the states during the bending process and at the end of the bending process, in the case of the sweep of the lateral form parts 5, 6 a rolling-off or respective unwinding process of the lateral form parts 5, 6 on the convex full mold take place. During this rolling-off process, the lateral form parts progressively press the glass pane 1 against the form 2 as shown by the points P, after which the lateral form parts break contact with the glass. The movement of the articulated axes 7, 8 in the curve-shaped grooves 13, 14 is alone accomplished under the effect of the forces of pressures exerted by the pressure pistons 9, 10, which produce the sweep of the lateral form parts 5, 6. In the final position of lateral form parts 5, 6, as is to be seen in FIG. 1C, the form surfaces touch the glass pane 1 only at their outermost end sections, while simultaneously the articulated axes 7, 8 in the curve-shaped grooves 13, 14 have reached respectively their final positions. The pressure cylinders 9, 10, which may be double-action cylinders, now sweep the form parts 5, 6 back into their initial positions. After the bending forms 2, 3 have withdrawn to their initial positions, the bent glass pane 1 is taken from the bending press. It can then be slowly cooled or be tempered by abrupt cooling.

Figure 3:
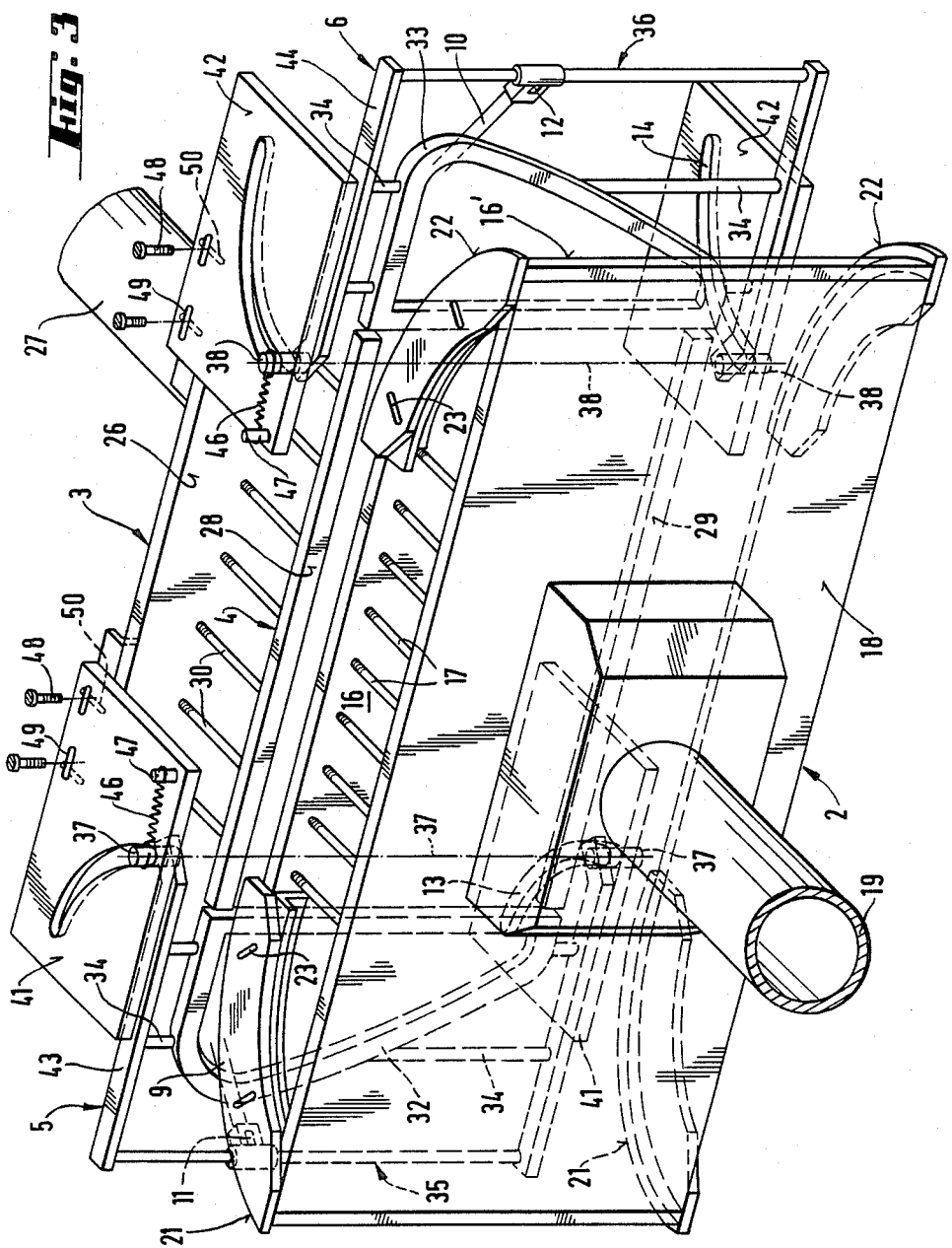
FIG. 3 is a front perspective of the embodiment of FIG. 2.
Figure 4:
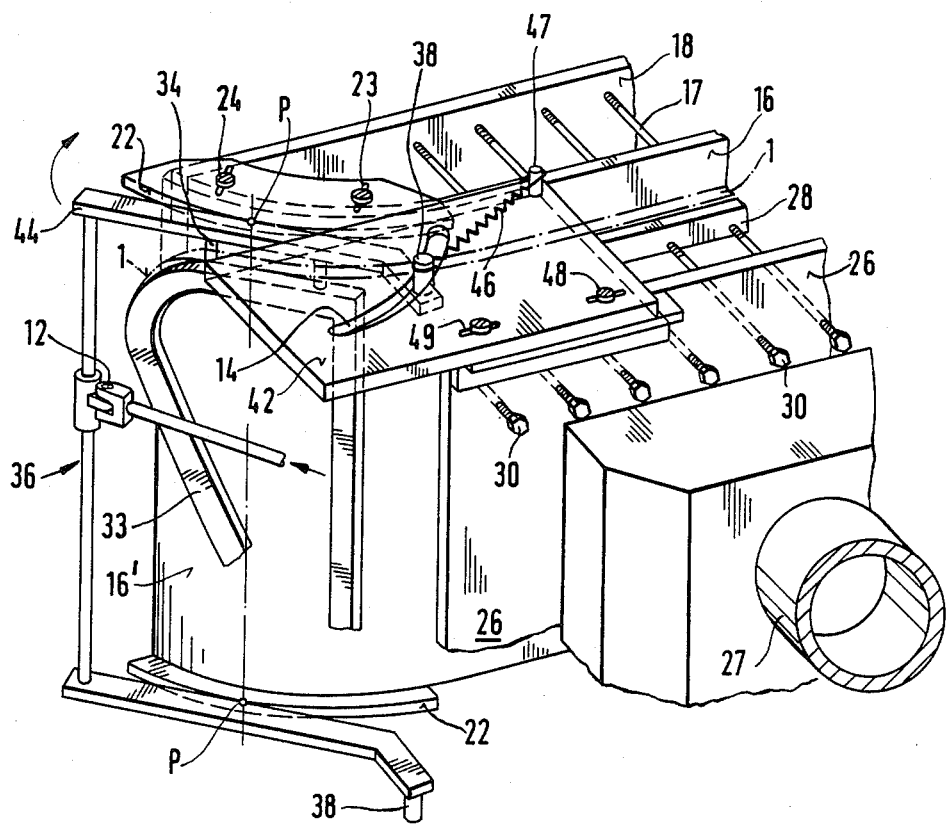
FIG. 4 is a partial view taken substantially in the direction of FIG. 2, showing an intermediate point of time during the bending process.

FIGS. 2-4 show a second embodiment according to the current invention. A bending press comprises a male mold and a female mold which work according to basic principles described in the discussion of Figures 1A-1C.

The male mold 2 comprises an all-over form plate 16 fixed through a series of adjustable screw bolts 17 on a carrier 18. With the assistance of the screw bolts 17, the shape of form plate 16 can be altered as the case requires. The carrier plate 18 is moved with the assistance of a suitable guide, for example with the assistance of a piston rod 19 of a pneumatic or hydraulic pressure-cylinder mechanis, into both the initial and final positions of the press. On both the end regions of the male mold 2, guide beads 21, 22 are disposed above and below the form surface 16'. The mounting of these guide beads 21, 22 on the male mold is accomplished through oblong holes 23 and screws 24 such that the position of the guide beads 21, 22, which protrude at the side toward the female mold 3 over the form surface 16' by, for example, a few millimeters, can be changed. The function of these guide beads 21, 22 will be more fully explained below.

The female mold 3 comprises a carrier plate 26 arranged at the press grooves, which is moved by the piston rod 27 into both the initial and final positions of the press. The middle rigid form part 4 comprises rails 28 and 29, which are mounted on carrier plate 26 by adjustable bolts 30. The lateral, sweepable form parts 5 and 6 comprise frame bending forms 32, 33, which are mounted through rods 34 to form frames 35, 36. The frame bending forms 32 and 33 correspond to the contour of the glass pane to be bent. In the illustrated case, in which the glass pane should obtain a cylindrical bending in its lateral end sections, the contact surfaces of the frame bending forms at any given time lie in a plane. The frames 35 and 36 are arranged swivel-mounted at the carrier plate 26 by their articulated axes 37, 38 and adjoining the middle form part. Frames 35, 36 are swept by pressures cylinders 9, 10 attached thereto.

The articulated axes 37, 38, are guided along the desired curved paths in the grooves 13, 14 formed in guiding-link plates 41, 42, as soon as the pressure cylinders 9, 10 start the sweep movement. The sweepable form parts respectively roll on the glass pane an on the male mold. In order to impart to the glass pane only the pressure required for the bending, the guide beads 21, 22 are so adjusted that in the case of the sweep process of the lateral form parts 5, 6, the horizontal sections 43, 44 of the frame bending form 35, 36 come into contact with the guide beads 21, 22 and roll-off on these guide beads 21, 22. The adjustment of the guide beads 21, 22 on the male mold 2 is moreover so undertaken that, as shown in detail in FIG. 4, at the line P—P determined by both the contact points P, a distance remains between the contact line of the frame form 33 and the form surface 16', which distance corresponds exactly to the thickness of the glass pane to be bent. In this way, it is assured that no unnecessarily high forces can be transferred to the glass pane.

In this way the horizontal frame sections 43 and 44 are pressed securely against guide beads 21, 22. After the completion of the bending, the articulated axes 37, 38 are returned to their initial positions by tension springs 46. The springs 46 are fixed at one end to tappets 47 and at the other end to articulated axes 37, 38. In lieu of these tension springs 46, other means may be provided which fulfill the intended purpose, as for example, pneumatic cylinders.

In the case of the curved paths given by the grooves 13, 14 for the movement of the articulated axes 37, 38 during the bending process, it is a question of involutes, which are given by the desired curvature of the glass panes, i.e., in the represented case, through the curvature of the guide beads 21, 22. The curved paths may be mathematically calculated. The guiding-link plates 41, 42 displaying the grooves 13, 14 are adjustably mounted at the carrier plate 26 in suitable ways, and indeed for example with assistance from screws 48, the oblong holes 49 in the guiding-link plates 41, 42 and the oblong holes 50 in the carrier plate 26 running crosswise to the oblong holes 49. In this way, correct adjustments in the positions of the guiding-link plates 41, 42 are assured.

In place of the connecting-link guide represented in the FIGS. 1 to 4 for the articulated axes 37, 38, one can in the case of the described bending press undertake the guidance of the articulated axes 37, 38 along the desired curve in another way as well, for example with the assistance of a multi-section crank mechanism, as it is described below in the case of another bending device.

Figure 5:
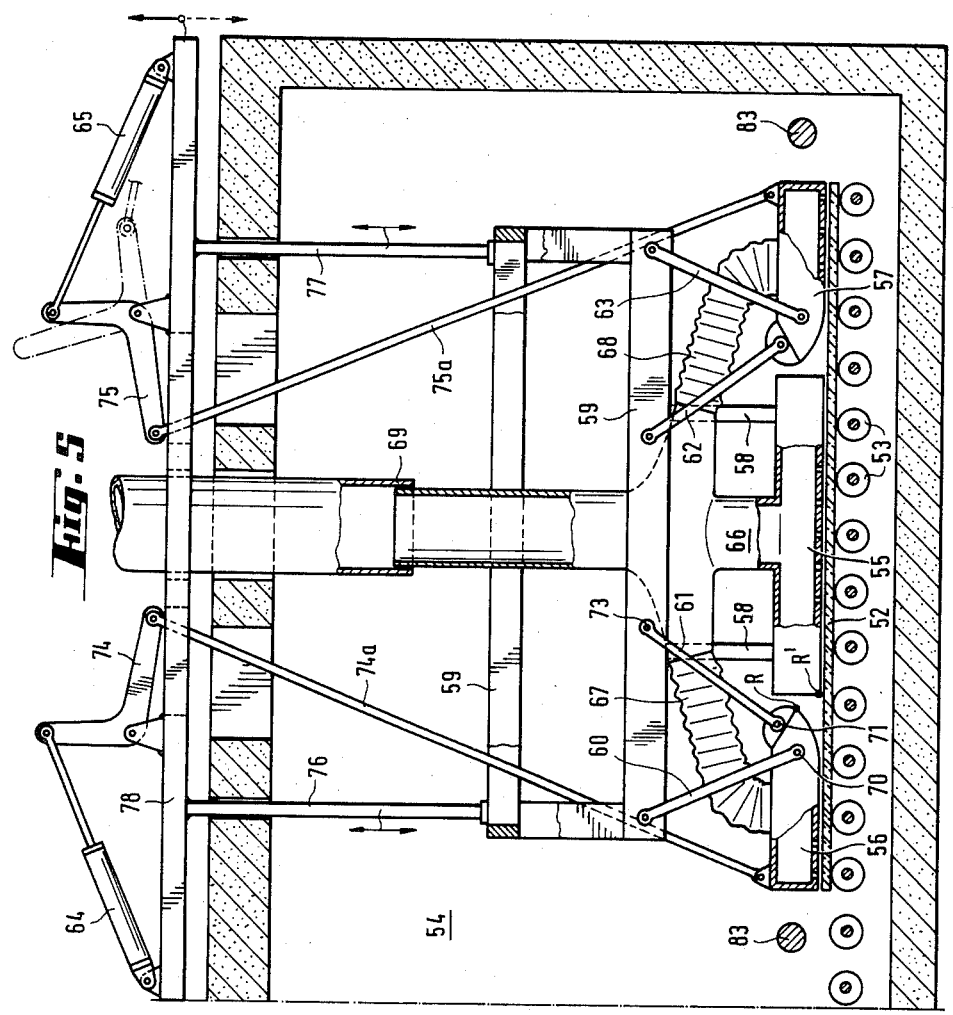
FIG. 5 is a front elevation, partly in section, of a third embodiment according to the current invention, before the start of the bending process, in which a glass pane is bent while in a horizontal position.
Figure 6:
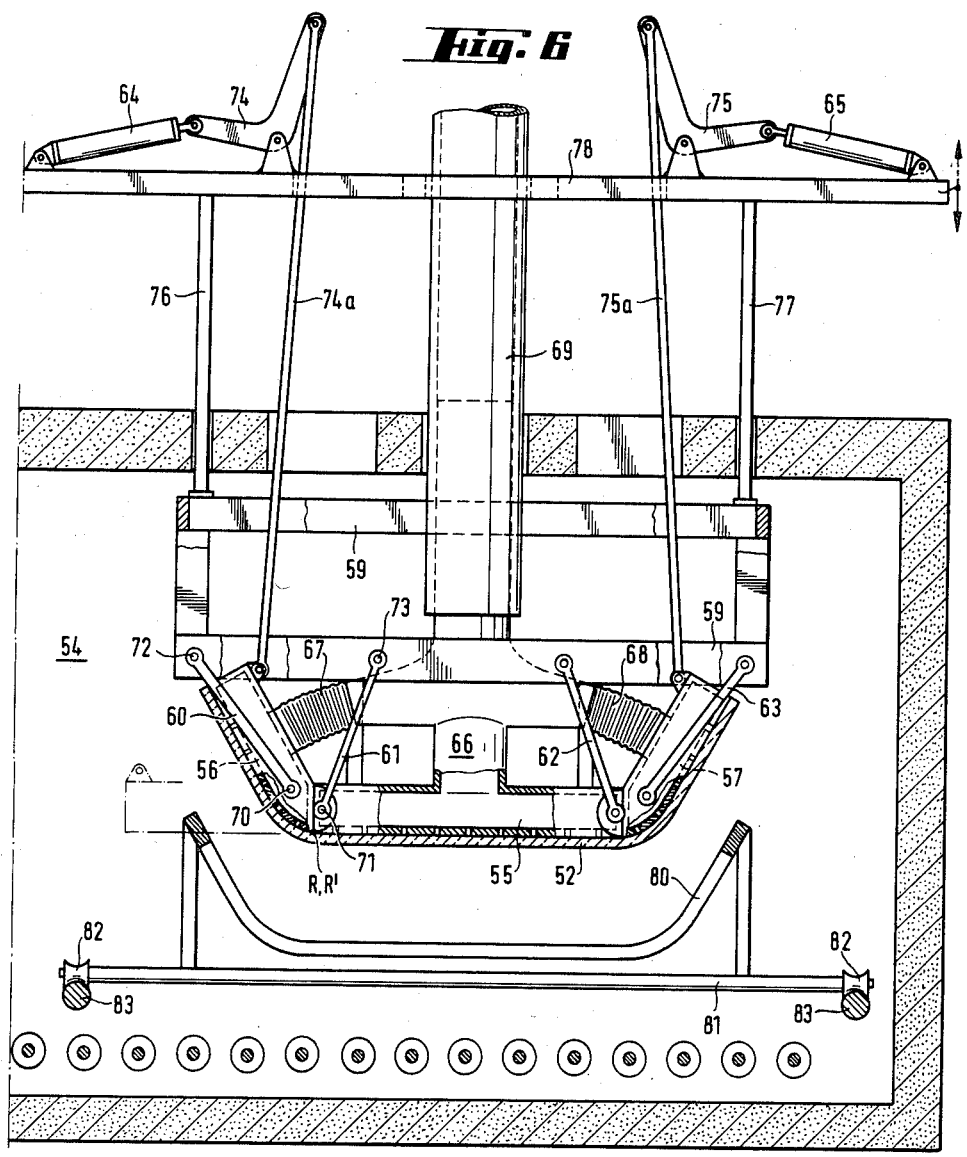
FIG. 6 is a view like FIG. 5, taken after completion of the bending process.

FIGS. 5 and 6 show a third embodiment according to the current invention. The glass pane 52 is pressed not through a multipart female mode against a male mold, but is instead held tight through suction against a multipart bending form, whose sweepable form sections are swung after the grasping of the glass pane, and thereby bend the glass pane 52 into the desired form.

The glass pane 52 is transported in this case on driven transport rollers 53 through a horizontal furnance 54, in which it is heated to bending temperature. When the glass pane 52 has reached the bending temperature, it is grasped by a raiseable and lowerable multipart suction device, which also is a bending form. The suction device comprises a middle suction-plate part 55 as well as two lateral suction form parts 56 and 57. The middle suction-plate part 55 is mounted rigidly by rods 58 on a frame 59. The lateral suction form parts 56 and 57 are attached to frame 59 so as to be sweepable with the assistance of two cranks 60, 61 or respectively 62, 63. The sweeping movement is driven by the pressure cylinders 64 and 65, which, through levers 74 and 75, activate the rods 74a, 75a, which in their turn are coupled at the sweepable suction form parts 56, 57. The pressure cylinders 64 and 65 are disposed outside of the furnace area, and indeed are mounted on a frame 78, which is connected by rods 76, 77 to the frame 59 inside of the oven. By driving means, not shown, the frame 78 can be moved vertically, with the complete arrangement mounted thereto, into upper and lower positions.

In the lower position of the suction form plate shown in FIG. 5, the substantially planar contact surfaces of the suction form parts 56, 57 lie in substantially the same plane as the contact surface of the middle suction plate 55, so that the glass pane 52 is simultaneously grasped by the middle suction plate 55 and both the suction form parts 56, 57 as soon as the individual suction-plate parts are put under partial vacuum. The evacuation of the middle suction plate 55 is accomplished by the pipe socket 66, and the evacuation of the suction form parts 56 and 57 by flexible suction conduits 67, 68, which all flow into the common telescope-sectioned foreshortenable and extendable tubing 69, which leads to a suitable vacuum generator.

For bending of the glass pane 52, both of the sweepable suction form parts 56, 57 are swung into the final position represented in FIG. 6. Using part 56 as a example, the articulated axis moves in a curve which is established by both the cranks 60, 61 and by the position of link points 70, 71 on the suction form parts 56, 55 and the link points 72, 73 on the carrier frame 59. The link points and the length of the craks 60, 61 may be calculated based on the curvature of the curved region of the suction form sections. Similar considerations pertain to the cranks 62, 63 at the form part 57. The conditions must be met that the curved surface of the sweepable suction form parts 56, 57 acts on the glass pane such that, at the end of the swinging process, the point R coincides with the point R' of the middle suction plate part 55, and moreover that no sliding relative movement occurs between the glass upper-surface and the contact surfaces of the form parts 56, 57.

More expediently, the construction is so designed that both the length of the cranks 60, 61 as well as the position of the link points 70, 71, 72, 73 are alterable. In this way, both corrections of the curved path describing the swivelling articulated axes may be undertaken, and curved paths for different curvatures may also be created, if the lower form body of the sweepable sucton form parts 56, 57 for example should be exchanged for another form body with another curvature.

When the glass pane 52 is grasped by the suction form and is bent into the desired form through horizontal sweep of the form parts 56, 57 into the final position, the rods 76, 77 are used to raise the frame 59 with the entire suction form, the partial vacuum being retained in the suction form. This upper position is represented in FIG. 6. Thereafter, a transfer car 81, bearing form frame 80 corresponding to the bent glass pane, is guided under the glass pane 52. Transfer car 81 is provided with rollers 82, which run on rails 83 disposed crosswise on the longitudinal axis of the furnace. The glass pane 52 is then deposited on the form frame 80 and, with the assitance of the transfer car 81, is driven into the cooling station, in which the glass is tempered thermally, for example through blowing of cold air.

The depositing of the glass pane 52 on the form frame 80, may be accomplished such that the glass pane is lowered with the assistance of the represented raising mechanism onto the form frame, and when it first reaches the form frame, or shortly before, the partial vacuum is terminated. In this case it is postulated that the glass pane 52 already has attained it final form through operation of the suction form 55, 56, 57.

One can nevertheless also carry out the procedure so that one allows the glass pane 52 to fall from a greater height onto the form frame 80 through interruption of the suction effect. Through its dynamic energy, the glass pane is further shaped by contact with the form frame 80 and assumes thereby along its contour the form provided by the form frame 80. In such case, the shaping of the glass pane is accomplished in two steps, whereby in the first shaping step a pre-shaping of the glass pane by the multipart suction bending form is accomplished, and thereafter in the second shaping step the required final shaping is accomplished.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Apparatus for bending a glass pane to a desired form comprising:
    a rigid first part having a substantially flat first contact surface;
    a rigid sweepable part mounted for relative motion with respect to said first part around an articulated axis and between a first position spaced from said first part and a second position closer to said first part than said first position, said sweepable part having a second contact surface, a portion of said second contact surface that is disposed adjacent said first part being arched according to a desired final curve of the glass pane;
    means for holding a glass pane against said first and second contact surfaces;
    moving means for moving said sweepable part with respect to said first part;
    guiding means establishing constant dislocation of said articulated axis with respect to the glass pane along a predetermined curved path during said motion of said sweepable part, said curved path having a shape corresponding to the desired bend of the glass pane, said guiding means guiding said arched portion of said second contact surface of said sweepable part in rolling motion on the surface of the pane without relative sliding movement on the surface of the pane during said movement of said sweepable part, wherein the glass pane is bent substantially without relative sliding motion between said pane and said first and second parts.

2. Apparatus according to claim 1, wherein said guiding means comprise a guiding-link plate having a curved slot therein in the shape of said curved path, said articulated axis being received in said curved slot.

3. Apparatus according to claim 1, further comprising a supporting frame supporting said first and sweepable parts, said guiding means comprising two crank members articulated at link points to said supporting frame and to said sweepable part, said link points being disposed such that said arched portion of said sweepable part rolls on the surface of the pane without relative sliding movement on the surface of the pane during said movement of said sweepable part.

4. Apparatus according to claim 3, wherein said guiding means comprise means for guiding said sweepable part such that negligible tensile forces are exerted on the glass pane in the direction of the pane surface.

5. Apparatus according to claim 1, wherein:
    said first part comprises a first suction plate,
    said sweepable part comprises a second suction plate, and
    said means for holding a glass pane against said first and second contact surfaces comprises means for establishing a partial vacuum in said first and sweepable parts.

* * * * *